United States Patent [19]
White et al.

[11] Patent Number: 5,779,580
[45] Date of Patent: Jul. 14, 1998

[54] FRONT BICYCLE DERAILLEUR

[76] Inventors: Douglas M. White, P.O. Box 395, Point Reyes, Calif. 94956; Erik Gambera, 130 Greenwood Ave., San Rafeal, Calif. 94901

[21] Appl. No.: 708,275

[22] Filed: Sep. 3, 1996

[51] Int. Cl.$^6$ ............................................. F16H 59/00
[52] U.S. Cl. ................................. 474/80; 74/502.2
[58] Field of Search ........................... 474/78, 80, 81; 74/502.2, 475

[56] References Cited

U.S. PATENT DOCUMENTS

| | | |
|---|---|---|
| 4,002,080 | 1/1977 | Huret et al. . |
| 4,193,309 | 3/1980 | Nagano . |
| 4,259,873 | 4/1981 | Nagano et al. . |
| 4,551,121 | 11/1985 | Nagano . |
| 4,586,913 | 5/1986 | Nagano . |
| 4,900,291 | 2/1990 | Patterson . |
| 4,938,733 | 7/1990 | Patterson . |
| 5,197,927 | 3/1993 | Patterson et al. . |
| 5,201,236 | 4/1993 | Nagano ............................ 474/80 X |
| 5,389,043 | 2/1995 | Hsu ................................. 474/80 |
| 5,496,222 | 3/1996 | Kojima et al. ................... 474/80 |
| 5,607,367 | 3/1997 | Patterson ........................ 474/80 |

*Primary Examiner*—Roger J. Schoeppel
*Attorney, Agent, or Firm*—Malcolm B. Wittenberg

[57] ABSTRACT

A front derailleur for a bicycle as well as a system including the combination of a front derailleur and shifter. The derailleur includes a fixing member securedly attached to a seat tube of a bicycle frame through a tightening band, a chain guide and a pair of linkage members for supporting the chain guide movable in reciprocation with respect to the fixing member. Further included in the front derailleur is a spool rotatably connecting the fixing member to the chain guide whereby actuation of a shifter located remotely from the derailleur results in rotation of the spool through looped cable causing pivoting of the linkage members and movement of the chain guide in reciprocation with respect to the fixing member.

7 Claims, 4 Drawing Sheets

FRONT BICYCLE DERAILLEUR

FIELD OF THE INVENTION

The present invention relates in general to a front derailleur for a bicycle. More particularly, the present invention relates to a spooled front derailleur which eliminates the need for a biasing mechanism.

BACKGROUND OF THE INVENTION

Front derailleurs for bicycles are well known in the art. Illustrative are the front derailleurs disclosed in U.S. Pat. Nos. 4,586,913 and 4,551,121.

The typical front derailleur is provided with a fixed bicycle frame member, a chain guide having an outer guide plate and an inner guide plate, and linkage members comprising a pair of parallel link plates. The linkage members are connected to the fixed bicycle frame member and chain guide through pivot pins extending perpendicularly to the axis of the multistage front gear to thereby form a parallelogram linkage mechanism which allows the chain guide to move axially of the front gears.

The front derailleur is also provided with a return spring. The return spring biases the chain guide toward the bicycle frame, that is, from the larger diameter front gear to the smaller diameter gear.

In operation, a control wire is pulled against the return spring to actuate the linkage mechanism which moves the chain guide axially of the multistage front gears, thereby shifting the chain from a smaller diameter gear to a larger diameter gear. To shift the chain from the larger diameter gear to a smaller diameter gear, the control wire is loosened and the restoring force of the spring moves the chain guide and, hence, chain.

As is well known, the above described parallelogram front derailleur has significant drawbacks. The primary drawback is that chain movement from a larger diameter front gear to a smaller diameter gear is totally dependent on the restoring force of the return spring. Thus, if the restoring force in insufficient, gear changes from a larger diameter gear to a smaller gear can be severely restricted.

Accordingly, it is the primary object of the present invention to provide a front derailleur which effectuates gear changes from a larger diameter gear to a smaller gear without the need for a return spring.

It is another object of the present invention to provide a front derailleur which is simple, efficient and requires minimum components for operation.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

SUMMARY OF THE INVENTION

The present invention relates to a front bicycle derailleur and a system which includes the front bicycle derailleur and remotely located shifter.

The derailleur comprises a fixing member securedly attached to a seat tube of a bicycle frame through a tightening band, a chain guide and a pair of linkage members for supporting the chain guide movable in reciprocation with respect to the fixing member. Linkage members are provided as being pivoted at one of their ends to the fixing member through a first pair of linkage pivot pins and at their other ends to the chain guide through a second pair of pivot pins.

The present invention differs from the prior art in providing a spool rotatably connecting the fixed member to the chain guide, the spool including means for fixedly attaching looped control cable emanating from the shifter. Actuation of the shifter results in rotation of the spool causing pivoting of the linkage members through their linkage pivot pins and movement of the chain guide in reciprocation with respect to the fixing member.

It is noted that in practicing the present invention, biasing springs have been completely eliminated.

DETAILED DESCRIPTION OF THE INVENTION

Figure 1:
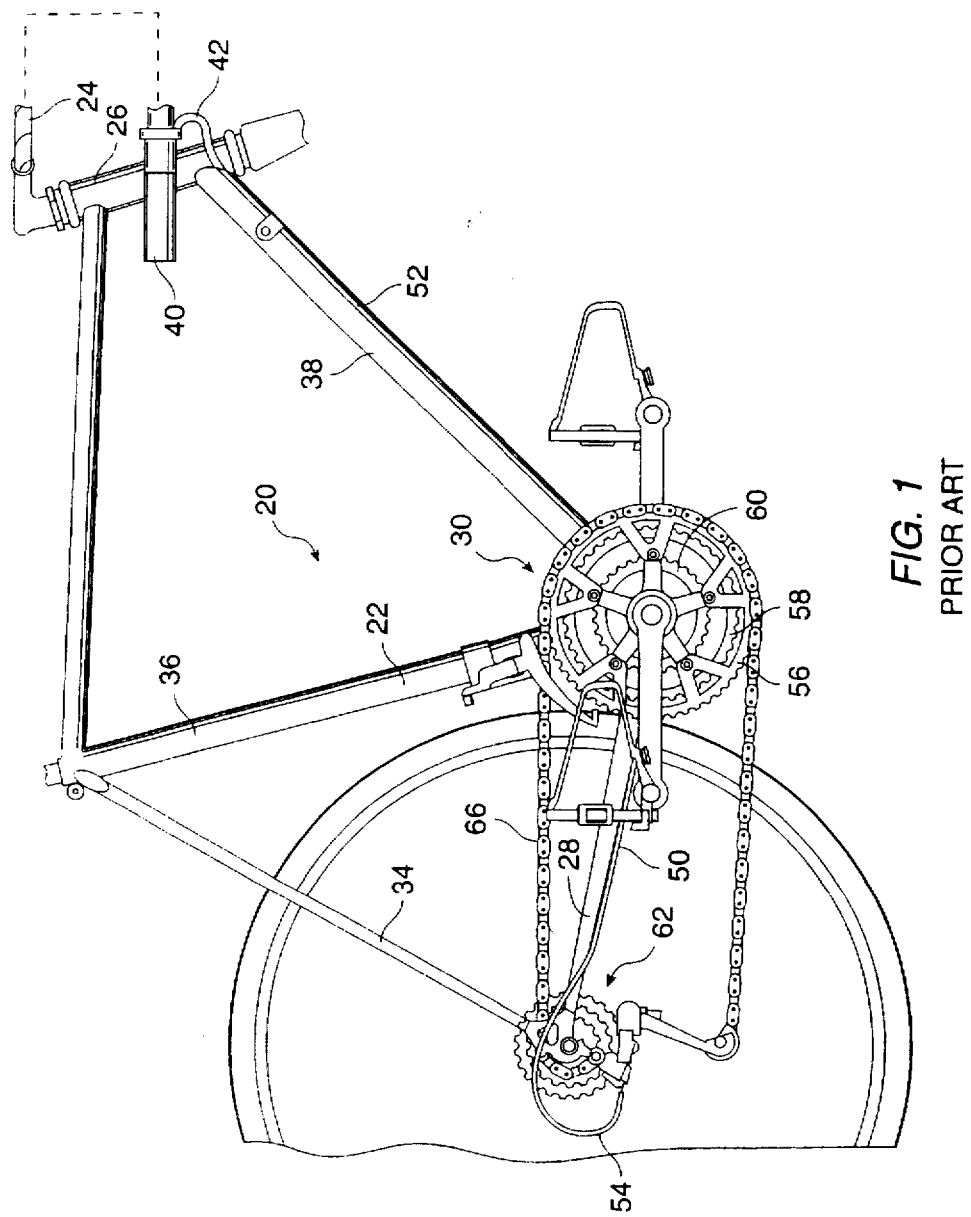
FIG. 1 is a side plan view of a portion of a bicycle including its front and rear sprockets and drive chain for accepting the present invention.

Referring to FIG. 1, there is shown a conventional bicycle indicated generally at 20. The bicycle 20 includes a frame 22 and a handlebar 24 inserted into a fork tube 26. The frame 22 includes a chainstay 28 disposed between a crank 30 and a rear hub 32, a seat stay 34 disposed between the hub 32 and the top of a seat tube 36, and a down tube 38 which is disposed between the fork tube 26 and crank 30. Disposed on the end of the handlebar 24 is a grip 40. Fitting immediately inboard of grip 40 is a rotatable shifter 42 by which the rider displaces a control cable 50.

The control cable 50, which is preferably a multi-filament alloy or steel cable, is generally referred to as a Bowden type cable system. The upper end of the cable 50 resides within a frame housing portion 52. Another cable portion resides within a cable housing 54 near the rear hub 32 of the bicycle 20.

Figure 3A:
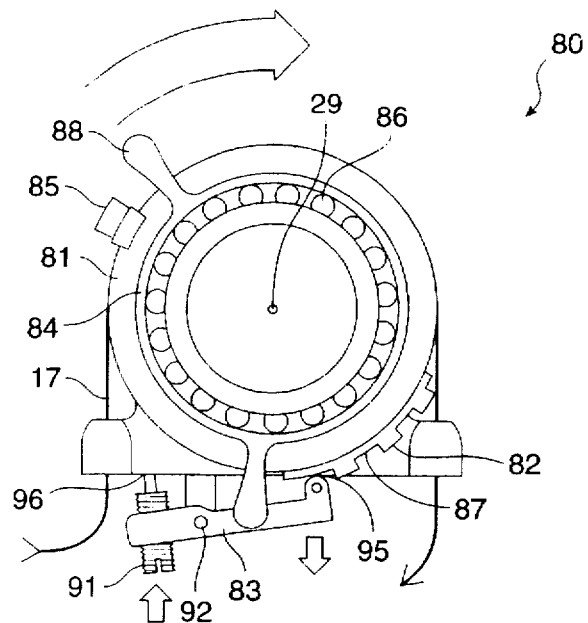
FIGS. 3a and b are directed to a shifter for a bicycle as disclosed in applicant's U.S. application Ser. No. 08/704,292 filed Aug. 28, 1996 for use with the derailleur of the present invention.
Figure 3B:
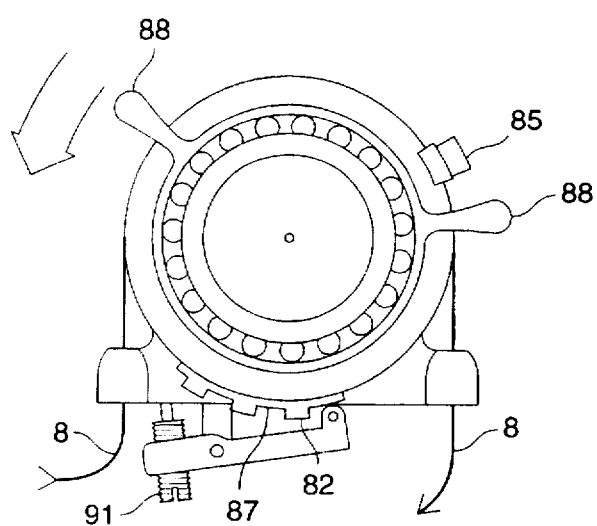

On road bikes, the crank 30 would generally have two chain rings 56 and 58. However, as illustrated in FIG. 3, in mountain bikes, the crank 30 can have a third chain ring 60 and the diameter of the smallest chain ring can be substantially different from the largest chain ring.

The freewheel, indicated generally at 62, has a plurality of sprockets 64 which are of various sizes. A conventional drive chain 66 is routed from a selected one of the chain rings 56, 58, 60 around the crank 30 to a selected one of the sprockets on the rear of the bicycle, allowing the rider to select a gear ratio from a combination of chain rings and sprockets.

As noted previously, front derailleurs are provided with a chain guide having inner and outer plates supported to reciprocate through operation of a pair of linkage members connected to a fixing member fixed to a seat tube of the bicycle frame. All such devices are further provided with a return spring biasing the chain guide such that shifting between chain rings is the result of either taking up slack on the cable to fight the return spring tension or loosening of cable to enable the spring to urge the chain guide to another position. In practicing the present invention, however, the return spring is eliminated resulting in shifts between chain ring locations which are positive, repeatedly accurate, and provide the same tension or feel to the bicycle rider regardless of whether shifts are made to larger or smaller chain rings.

Figure 2:
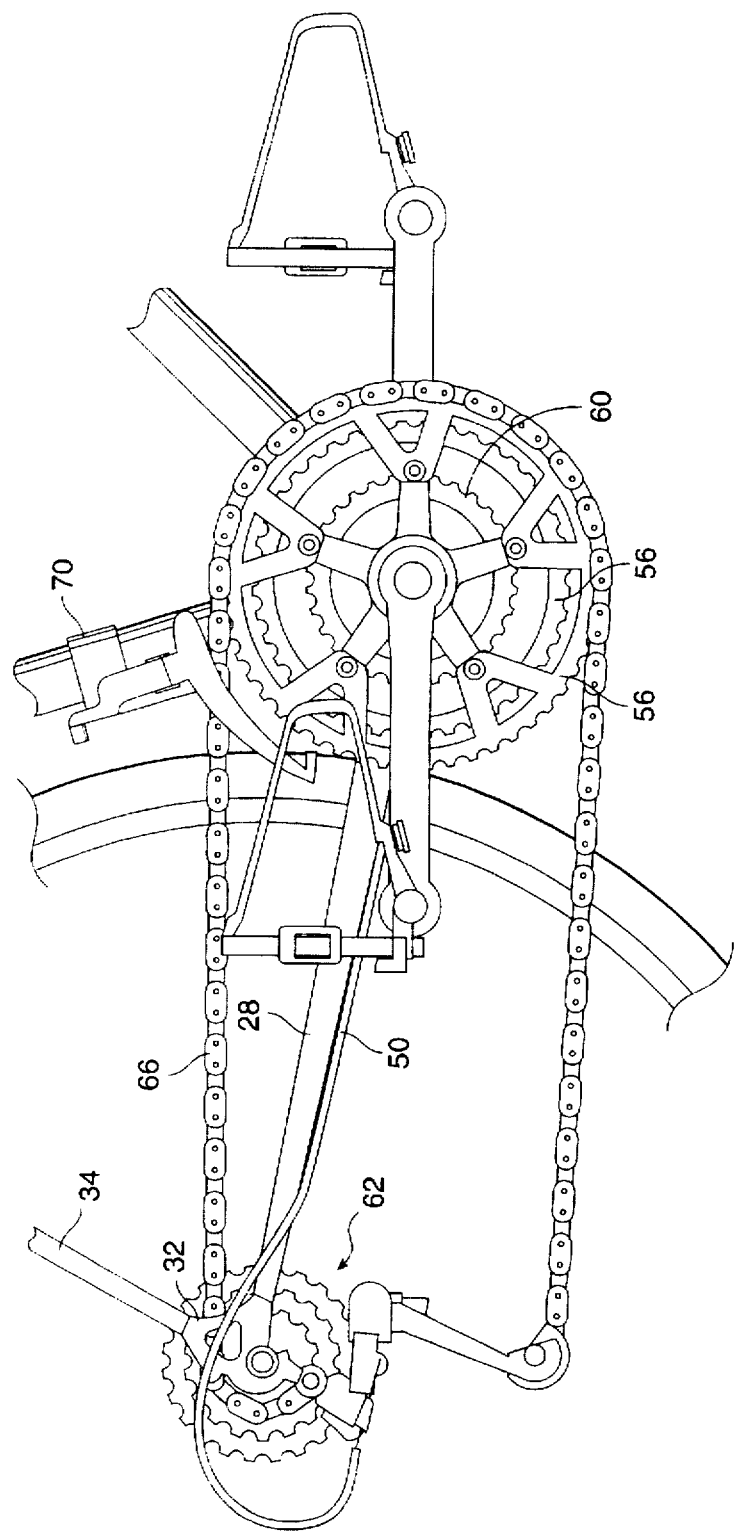
FIG. 2 is a side plan view as FIG. 1 with the front and rear sprockets and drive chain enlarged.
Figure 4:
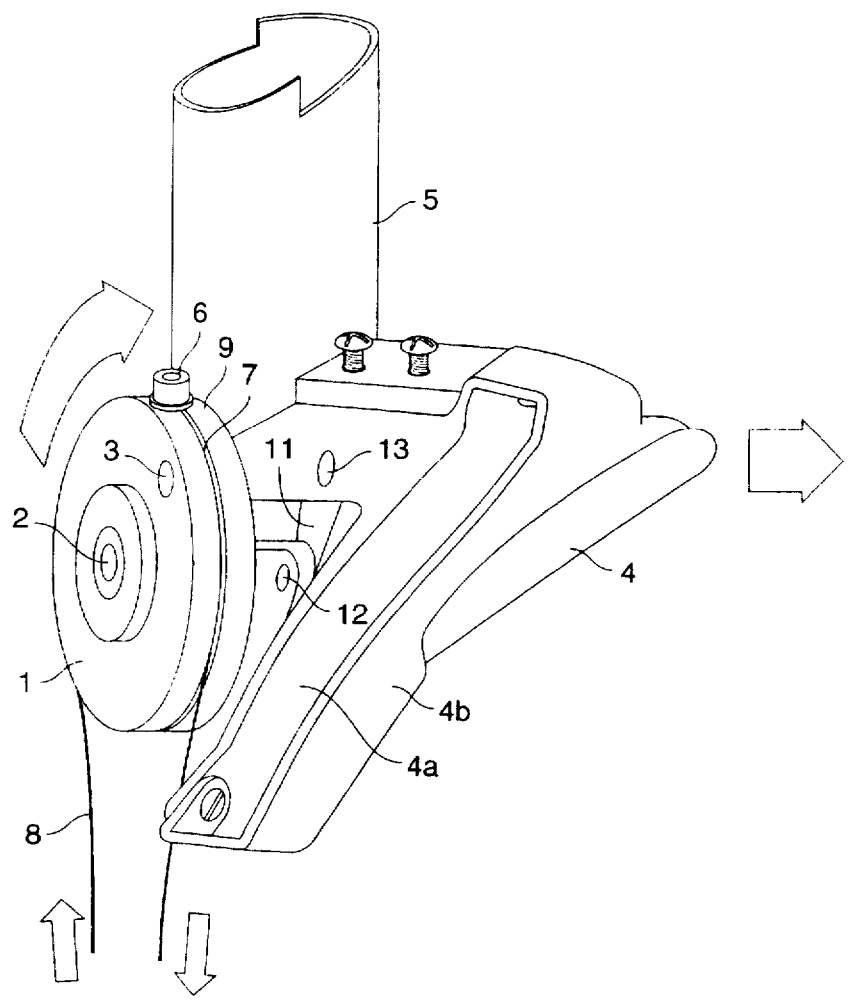
FIG. 4 is a perspective view of the front derailleur of the present invention.

FIG. 4 depicts front derailleur 10 of the present invention. Although not shown, the derailleur includes a fixing member securely attached to seat tube 5 as shown as element 70 (FIG. 2). As noted, the fixing member generally comprises a tightening band which surrounds seat tube 5 and can be tightened by a suitable tangential set screw once the band is in a proper location.

Chain guide 4 is provided having inner and outer plates 4a and 4b for accepting drive chain 66 (FIG. 2).

Front bicycle derailleurs further generally include a pair of linkage members for supporting the chain guide movable in reciprocation with respect to the fixing member. One of said linking members identified as element 11 of FIG. 4 is pivoted at one of its ends to the fixing member through a first pair of linkage pivot pins, one of which being depicted in FIG. 4 as element 12 and at their other ends to chain guide 4 through a second pair of pivot pins, one of which being depicted as element 13 of FIG. 4. Details of this linkage can be seen by reference to U.S. Pat. Nos. 4,586,913 and 4,551,121, the disclosures of which are incorporated by reference.

The present invention differs from the prior art by providing spool 1 rotatably connecting the fixing member to chain guide 4 which replaces the return spring which, as noted previously, biases the chain guide. The spool 1 is retained on the front derailleur by mounting pins 2 and 3. Mounting pin 2 is retained by the fixing member and passes through the geometric center of the spool while mounting pin 3 is retained by chain guide 4 and passes through the body of spool 1 in a location radially remote from the geometric center of spool 1.

Spool 1 includes means 6 for fixedly attaching looped cable thereto. As noted, means 6 is a setting screw which can be loosened to allow for threading of the cable through groove 7 located on surface 9 of spool 1 and then tightened to securely clamp the cable in place. Looped cable 8 emanates from shifter 80 (FIG. 3a and 3b) whereby actuation of the shifter results in rotation of the spool causing pivoting of linkage members through their linkage pivot pins and movement of chain guide 4 in reciprocation with respect to the fixing member.

As noted, rotation of spool 1 is the direct result of movement of looped cable 8. Shifting of looped cable 8 can best be visualized by a reference to FIGS. 3a and b whereby looped cable is shown to pass over lever 81 and resides within a groove found within lever 81 and is clamped in position by adjustable clamp 85. Although cable 8 is intended to have a minimum slack between shifter 80 and front derailleur 10, it is impossible to remove all slack in control cable 8 and, as a consequence, the shifter is capable of accommodating slack while still providing for accurate front derailleur shifting. In this regard, reference is made to applicant's co-pending application Ser. No. 08/704,292 filed on Aug. 28, 1996, the disclosure of which is incorporated by reference.

Lever 81 is provided with tabs 88 conveniently configured approximately 180° apart to enable the user to apply thumb or finger pressure thereto rotating lever 81 in either direction about central axis 89 thereby moving looped cable 8 as desired. Lever 81 rotates about central axis 89 on friction reducing bearings 84.

Bicycle gear shifter 80 is further provided with indexing plate 82 having a series of grooves 87. Indexing plate 22 can be rotated from shift point to shift point over grooves 87 by providing tensioner 83. Tensioner 83 is pivoted over fulcrum 92 so that arm 95 can be caused to engage each groove 87 as dictated by the user's thumb or index finger pressure placed upon tabs 88 of lever 81. Tensioner 83 is adjustable by turning spring-loaded screw adjuster 91 at its distal end. By turning spring-loaded screw adjuster 91, one can adjust the force of arm 95 and thus the corresponding amount of thumb or finger pressure necessary to move the shifter past each groove 87.

Indexing plate 82 is free floating about central axis 89. As such, there is provided a gap between the terminal ends of indexing plate 82 and lever 81 so that the lever moves a certain predetermined distance depending upon the size of the predetermined gap. The purpose of this optional expedient is to enable lever 81 to move a certain distance in order to take up any slack in looped cable 8 prior to moving indexing plate 82 and thus changing the position of chain guide 4 in resulting drive chain over chain rings 56, 58 and 60. In other words, grooves 87 are spaced so that as each groove is indexed by tensioner 83, chain guide 4 moves the bicycle's drive chain 66 from chain ring to chain ring so that the bicycle's drive chain would be appropriately aligned over the appropriate chain ring at specific grooves 27.

I claim:

1. In a front derailleur for a bicycle comprising a fixing member securedly attached to a seat tube of a bicycle frame through a tightening band, a chain guide, a pair of linkage members for supporting the chain guide movable in reciprocation with respect to the fixing member, said linkage members being pivoted at one of their ends to the fixing member through a first pair of linkage pivot pins and at their other ends to the chain guide through a second pair of pivot pins, the improvement comprising providing a spool rotatably connecting said fixing member to said chain guide, said spool receiving looped cable emanating from a shifter located remotely from the front derailleur whereby actuation of said shifter results in rotation of said spool causing pivoting of said linkage members through said linkage pivot pins and movement of said chain guide in reciprocation with respect to the fixing member without spring biasing said linkage member.

2. The front derailleur of claim 1 wherein said spool is provided with a grooved surface for accepting said looped cable and at least one clamp for fixedly clamping said looped cable to said spool.

3. A system for changing the position of a bicycle drive chain between chain rings of a bicycle crank, said system including a bicycle gear shifter for actuating movement of a chain guide of a front derailleur by means of a looped cable extending between the shifter and derailleur, said shifter comprising a lever rotatable about a central axis of said shifter whereby thumb or finger pressure applied to the lever causes said lever to rotate resulting in movement of the derailleur and consequent shifting of the bicycle drive chain between chain rings of said crank, said shifter further including means for fixedly attaching said looped cable to said lever and said front derailleur comprising a fixing member securedly attached to a seat tube of a bicycle frame through a tightening band, a chain guide, a pair of linkage members for supporting the chain guide movable in reciprocation with respect to the fixing member, said linkage members being pivoted at one of their ends to the fixing member through a first pair of linkage pivot pins and at their other ends to the chain guide through a second pair of pivot pins, a spool rotatably connecting said fixing member to said chain guide, said spool receiving looped cable emanating from said shifter whereby actuation of the shifter results in rotation of said spool causing pivoting of said linkage members through said linkage pivot pins and movement of said chain guide in reciprocation with respect to the fixing member without spring biasing said linkage members.

4. The system of claim 3 wherein said shifter further comprises an indexing plate having a series of grooves rotatable with said lever including a tensioner for providing releasable stops between grooves of said indexing plate whereby the spacing of the grooves of the indexing plate are generally configured such that rotation of said lever between adjacent grooves of the indexing plate results in movement of said looped cable in an amount to move said chain guide between adjacent chain rings of said crank.

5. The system of claim 4 whereby said indexing plate floats with respect to said lever such that said lever is caused to rotate to take up anticipated slack in said looped cable prior to movement of said indexing plate.

6. The system of claim 3 whereby said lever of said shifter rotates on friction reducing bearings.

7. The system of claim 3 wherein said spool is provided with a grooved surface for accepting said looped cable and at least one clamp for fixedly clamping said looped cable to said spool.

* * * * *